TELEVISION INTERCOMMUNICATION SYSTEM

Filed Feb. 19, 1948 3 Sheets-Sheet 1

INVENTORS
CONSTANTIN S. SZEGHO
THOMAS G. POLANYI
BY Paul Kolisch
ATTORNEY

TELEVISION INTERCOMMUNICATION SYSTEM

INVENTORS
CONSTANTIN S. SZEGHO
THOMAS G. POLANYI
BY Paul Kolisch
ATTORNEY

INVENTORS
CONSTANTIN S. SZEGHO
THOMAS G. POLANYI
BY Paul Kolisch
ATTORNEY

Patented Jan. 9, 1951

2,537,173

UNITED STATES PATENT OFFICE 2,537,173

TELEVISION INTERCOMMUNICATION SYSTEM

Constantin S. Szegho and Thomas G. Polanyi, Chicago, Ill., assignors to The Rauland Corporation, Chicago, Ill., a corporation of Illinois Application February 19, 1948, Serial No. 9,493

1 Claim. (Cl. 178—6.8)

This invention relates to new and useful improvements in television intercommunication systems. More particularly, it relates to improvements in such systems whereby a single cathode ray tube can function satisfactorily both for analyzing and synthesizing video intelligence.

In the prior art it has been generally customary to employ at each station separate cathode ray devices for object analysis and image synthesis. This has been expensive but the use of separate tubes, in addition to temporarily meeting a need has averted certain optical problems. For one thing since the analyzing device has not itself been a light source, simultaneous receiving and sending have been possible without any problems of the admixture of spurious light to the image light emitted by the picture tube. Secondly, the separate cathode ray tubes for sending and receiving could be placed individually in correct positions with respect to elements of ancillary optical systems for respectively focusing object light onto the pick-up device and for presenting the synthesized image for viewing and these systems would not require readjustment on each occasion of a changeover from sending to receiving and vice versa. An example of the prior art is shown in Fig. 1 of U. S. Patent No. 2,420,198 to A. H. Rosenthal, June 20, 1944.

However, the way of the prior art has been an expensive one. Pick-up tubes of the kind most commonly used in the prior art, and shown in the patent mentioned above, are a most expensive component of the equipment. The manufacturer cannot even economize on this type of tube by using a small size, since, due to the nature of its mosaic, object analysis would lack adequate definition.

Obviously, it is desirable to devise an intercommunication system which does not require a pick-up cathode ray tube of the photosensitive mosaic type. In fact, it is even more desirable to devise the system so that the image-producing picture tube can also serve for analyzing or "pick up." This will reduce the number of the cathode ray tubes from two to one and, whether such tubes be special or ordinary, they are the most expensive items of televising equipment.

In the prior art it has already been known to employ an ordinary fluorescent screen cathode ray tube for producing a scanning spotlight which may be focused upon an object surface in an analyzing arrangement also employing a photoelectric tube. Thus a tube of the photosensitive mosaic type is not essential. Where, however, it is sought to employ one picture tube for both analyzing and synthesizing, certain optical problems arise. To begin with since the single tube will be emitting at certain times light rays constituting elements of an image and at others light rays constituting a spot of light for scanning the object surface (the latter being either unmodulated or modulated in a manner unrelated to the received video signal for producing the image) it becomes possible, where there is inadequate time and/or space separation between the different emissions, that the contrast of the synthesized image will suffer. Secondly, one or more elements of the optical system which is required for focusing the scanning spotlight raster onto the object surface will be in the way of image light produced during receiving periods and therefore will block from view or distort the image synthesized on the tube screen.

It is an object of the present invention to devise an improved television intercommunication apparatus employing at each station a single fluorescent screen cathode ray tube for performing both an analyzing and a synthesizing function in which there is an optical system for focusing an image of the spotlighting raster onto the object, which may be the face of an operator at that station, and a means for presenting to the operator at that station an image produced on the tube screen which image is unobstructed by any element of said optical system for focusing.

It is a further object of this invention to devise an improved television intercommunication system of the kind described above in which the single tube performs its analyzing and synthesizing functions, respectively, in different periods of time selectable by the operator by his use of synchronized mechanical and electrical switch-over means, for example, mechanical means for altering the position of one or more optical elements of the spotlight focusing system so that it (or they) will not interfere with the propagation path of image light to the observer's eyes and for at the same time switching electrical connections to change over the tube circuit from a sending to a receiving arrangement. As is known, in certain intercommunication systems a single audio transmission line is made to carry speech signals in either of two directions in accordance with an operator's positioning of a switch. Where desired, the mechanical and electrical means described above may also comprise means for at the same time disconnecting a corresponding single video transmission line from the television sending apparatus, i. e. the channel connected to the output of the photoelectric tube employed herein, and for connecting it to the control grid of the cathode ray tube.

It is a further object of this invention to devise an intercommunication system of the kind described above in which the apparatus at one or more of the stations includes a second optical system for magnifying or producing an enlargement of the image produced on the tube screen.

It is a further object of this invention to devise an improved intercommunication system which employs a single fluorescent screen cathode ray tube for sending and receiving and which, for preserving image contrast, relies on separating in space, rather than in time, the two kinds of emissions produced by the tube, for example, in which a means is provided for spatially separating light emissions of the tube into two portions in order to utilize one for object spotlighting and the other for image synthesizing, and for diverting spotlighting emissions from the path of image emissions in order to preserve contrast, instead of a means for permitting the tube to function in its two different capacities during entirely different relatively long periods of time selectab'e by the operator. In an arrangement employing space separation there is no necessity, optically, for time separation. However, due to other considerations, for example, the fact that in an ordinary tube only one electron beam is available, it may be necessary to allot successive alternate periods for producing spotlight and image emissions, respectively. These may alternate, however, as rapidly as the equipment permits and, in preferred embodiments, this will be rapid enough so that, despite periodic interruptions of each by the other, sending and receiving will seem continuous and simultaneous. In such an arrangement spotlighting rays and image rays respectively will travel over entirely different paths from the tube to the operator's face. While a result of this will be that the operator's line of sight will not coincide with the axis of the optical system for projecting spotlight emissions on his face, it will permit all of the elements of the spotlight projecting system to remain in fixed adjustment without interference with the transmission of image rays.

Other objects, features and advantages of this invention will be apparent to those skilled in the art from the following detailed description of embodiments of the invention shown in the drawings, in which.

Figures 3, 3A:
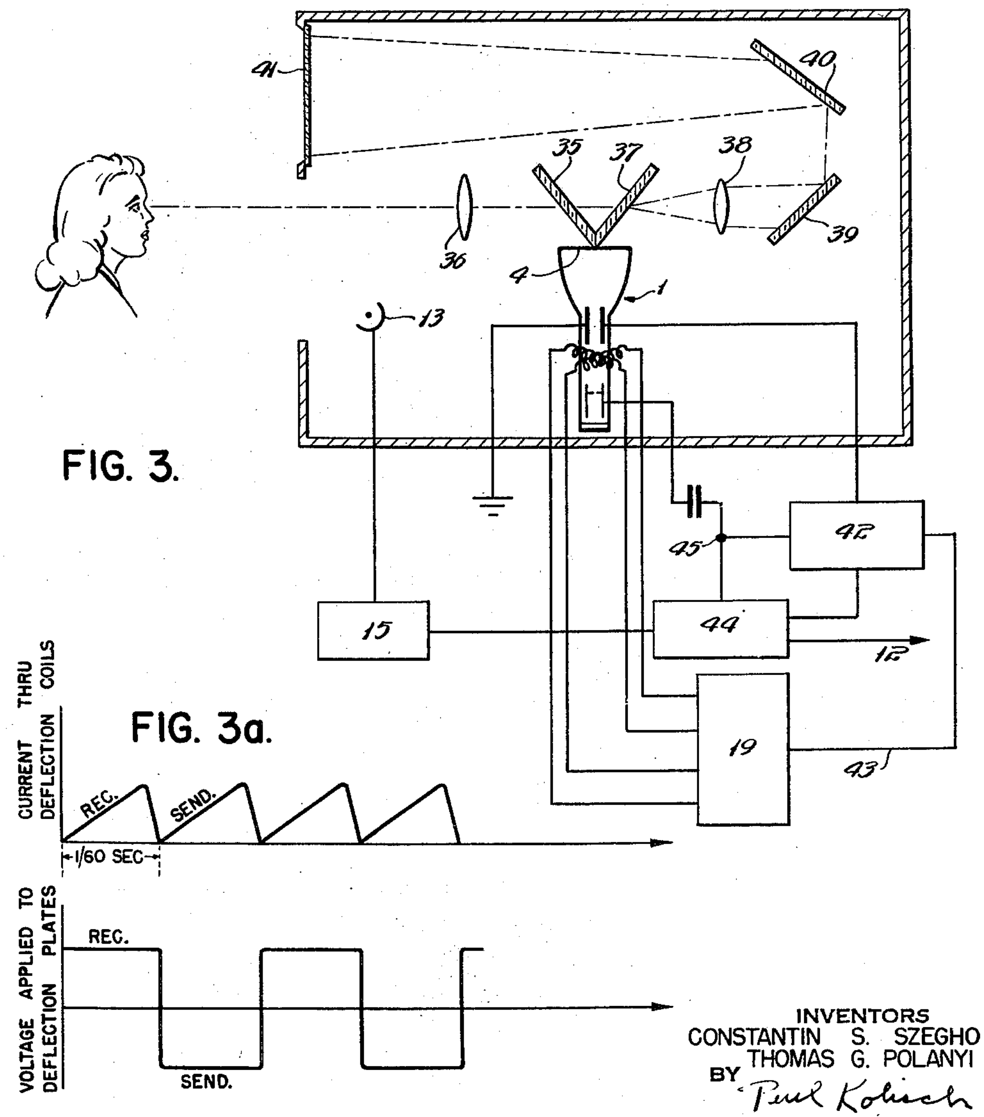
Fig. 3 illustrates an embodiment which relies on space separation of the spotlighting and image emissions produced by a single cathode ray tube and is arranged for effectively simultaneous sending and receiving.
Figures 4, 5:
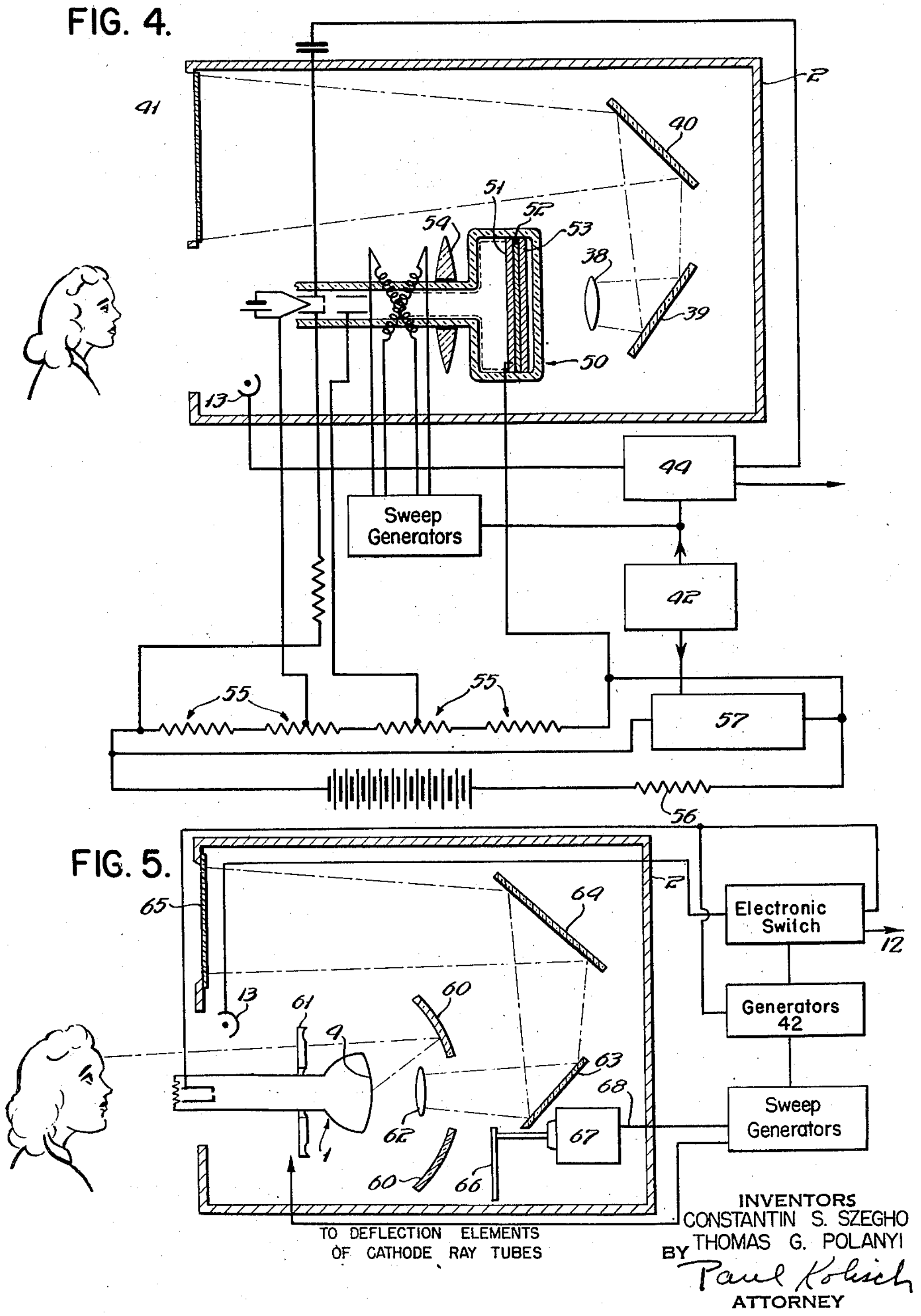

Fig. 3*a* shows the periodic time relationship and wave forms of voltages and currents utilized in some of the components of the embodiment of Fig. 3;

Fig. 4 represents an alternate embodiment which also relies on space separation but in which the single cathode ray tube includes a novel target having a first surface fluorescent layer for producing a scanning spotlight, a second surface fluorescent layer for producing an image, and an opaque but electron-penetrab'e shield supporting the layers on its opposite sides and blocking emissions originating in either layer from radiating to the other; and Fig. 5 illustrates an embodiment employing two features of this invention: First, the use of an optical system for spotlighting focusing which has much higher efficiency than the system for image projection, whereby a limited amount of spotlight admixture may actually be permitted since the spotlight intensity can be reduced to a point where admixture will not excessively reduce contrast; second, the use of a shutter which revolves in synchronism with scanning for b'ocking the path for image light from the tube during spotlight periods to entirely eliminate loss of contrast. In an embodiment employing the second feature the first is not essential for the preservation of contrast but it may be used to increase the sensitivity of the pick-up arrangement.

Figure 1:
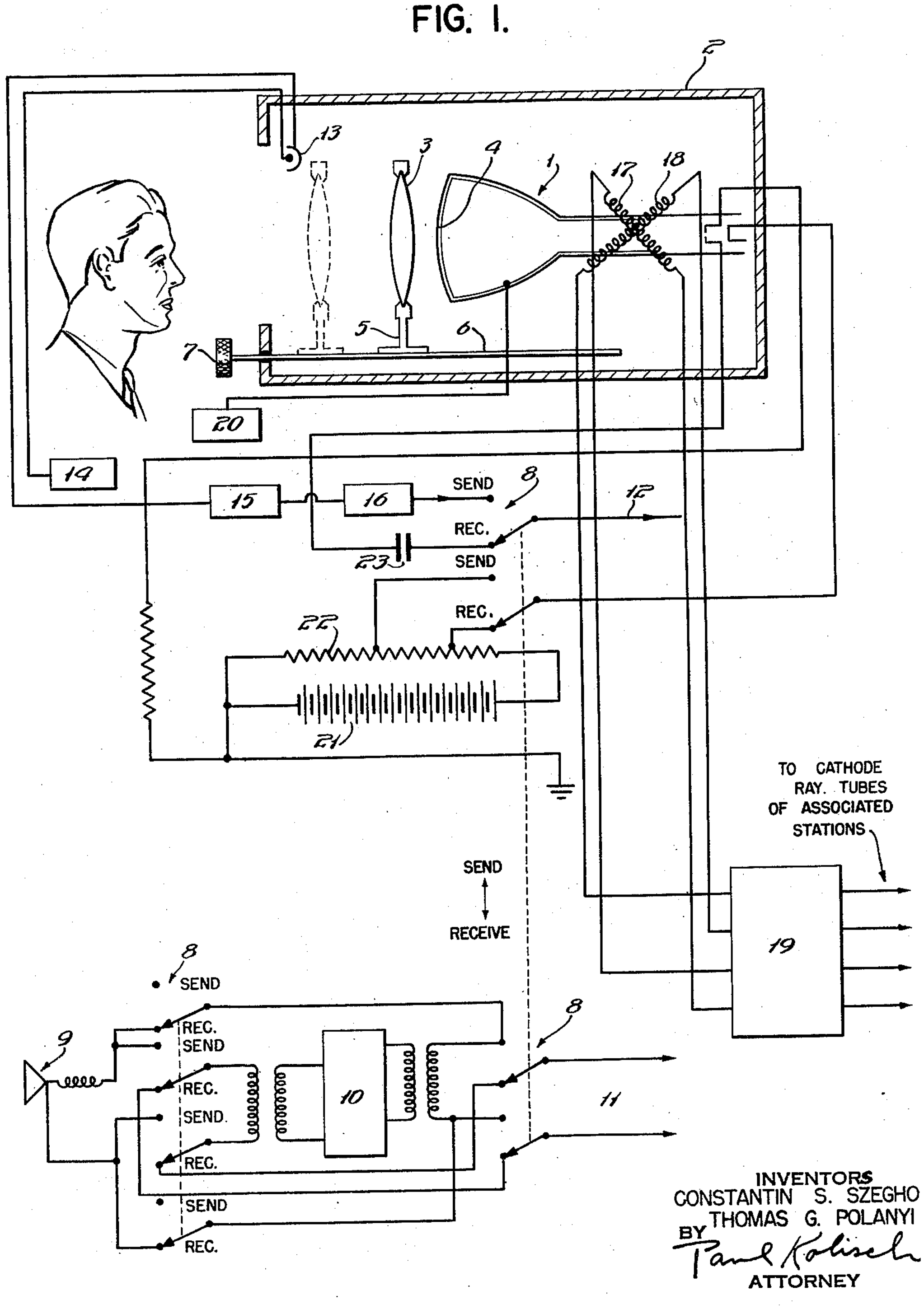
Fig. 1 is an embodiment of this invention in which a single cathode ray tube performs its analyzing and synthesizing functions during separate sending and receiving periods selectable by the operator.

Fig. 1 shows a fluorescent screen picture tube 1 which may be located within a cabinet 2 at one of the operator's stations of an intercommunication system. A lens 3 is positioned between the operator and the fluorescent screen 4 of tube 1. Lens 3 is mounted in a support 5 which, in turn, is supported on a sliding member 6 which is slidably mounted in a guideway (not shown) within cabinet 2 and has an extension protruding through the front end thereof and carrying on its end a knob 7 which is within reach of the operator. Sliding member 6 can be moved back and forth with respect to the operator by his pushing and pulling on knob 7, and adjustable stops, not shown, may be provided for limiting its travel to a forward or a rear position. In one of these two positions lens 3 is properly located for focusing the scanning spotlight raster on an imaginary plane at or near which the object surface should be placed during transmission. As shown in Fig. 1 the object surface in an intercommunication system will be the face of an operator. Where desired some convenient means may be included for helping the operator to know when his face is properly positioned at or near the imaginary object plane. For example, a position-indicating mark might be provided on a surface, such as a wall, adjacent to the equipment, or there might be provided within cabinet 2 an appropriately lighted symbol visible through a small magnifying glass and placed at such a distance from it that it will be in focus as to the operator only when he is at a proper distance from the front of cabinet 2. In its other limiting position lens 3 acts as an ordinary magnifying glass producing for the operator a magnified virtual image of the picture synthesized on screen 4. In this embodiment cathode ray tube 1 does not perform its two functions simultaneously and therefore there is no problem of light admixture and loss of contrast. For this reason it is possib'e to employ an arrangement as shown in Fig. 1 wherein the operator's line of sight is coaxial with the axis of the projection system for the scanning spotlight. If the operator does not move his face after switching from receiving to transmitting and if he continues to look into the center of lens 3, he will appear to the operator of a distant station with which he is in communication, to be looking into the eyes of that operator and, as is well known, this is a desirable feature. A double-throw eight-pole switch 8 is shown in Fig. 1 with sections of the switch located in three different places of the drawing to simplify its arrangement. The eight blades of this switch are mechanically ganged to each other and to sliding member 6. The switching of dynamic cone speaker 9 between its microphone and loud speaker functions may be accomplished in any convenient one of a number of known ways, for example in a known manner which is illustrated by the switching arrangement shown in Fig. 1. Since this portion of the figure relates to a known circuit it will not be described in detail herein. Block 10 represents an audio amplifier.

Switch 8 acts to connect the input and output terminals of block 10 to line 11 and cone 9, respectively, when the switch is in its receiving position and to connect them to the cone and the line, respectively, when it is in its sending position.

Video signals may be transmitted to and from this station over a loop including conductor 12. During a receiving period, i. e. when the blades of switch 8 are in the lower positions of the drawing, conductor 12 is connected to the control grid of tube 1 over a coupling condenser 23. On the other hand, during a transmit period, i. e. when the blades of switch 8 are in the upper positions of the drawing, conductor 12 is connected to the output of a video transmission channel whose electrical input is derived from a photoelectric cell 13 which may be a photo-multiplier tube. Photoelectric cell 13 is placed in a position, such as behind an opening in the front end of cabinet 2, where it will receive spotlight emissions reflected from the object surface. It is energized by a source of direct potential represented by block 14 and its output video signals are amplified in a video amplifier 15 which may be of any suitable known kind. It will be advantageous in an arrangement of this kind to apply so-called after-glow compensations to the video signals. Apparatus for accomplishing this is represented by block 16. Its function is to eliminate that part of the signal which results from the after-glow of a previously scanned point where the delay time constant of the fluorescent powder is longer than the duration of one picture point. R. C. circuits for accomplishing this are known and since this component, as such, does not constitute the invention herein, block 16 will not be fully described herein. However, a description of after-glow compensation is available on page 115 of the March 1947 issue of "Electronics."

The beam of tube 1 may be swept by any conventional means, for example, by electromagnetic deflection coils 17 and 18. Saw-tooth currents for these coils are provided by sweep generator 19 circuits for which are known and do not constitute the present invention. This same generator may be connected to deflection elements of corresponding cathode ray tubes of associated stations over appropriate transmission lines. This will result in synchronous formation of rasters at the various stations. The deflection coils of corresponding cathode ray tubes of associated stations may be connected in the reversed sense to each other. This will result in a non-inversed picture at the receiving station. While the transmitting system scans the operator through a projection lens, the resulting picture would otherwise be inversed if the receiving station views it through a magnifying glass which does not invert the picture like a projection lens does. Block 20 represents a source of high direct potential for energizing an accelerating electrode of tube 1.

In preferred embodiments it may be desirable to utilize a higher level of average electron beam current during analyzing periods than during synthesizing periods in order to employ greater brilliance for spotlighting than for image synthesis. For this reason the changeover switch may be arranged to alter the cathode-to-grid bias of tube 1 each time that it is moved between its sending and receiving positions. As illustrated in Fig. 1 a source of biasing potential comprising a battery 21 and a voltage divider 22 has its negative terminal permanently connected to the control grid and affords either of two positive taps for connection to the cathode. A blade of switch 8 is adapted to connect the cathode of tube 1 to voltage divider 22 at the less positive one of the two taps when the switch is in its transmitting position and at the more positive one when it is in its receiving position.

Obviously, the magnifying function of lens 3 during receiving is not essential, even though it may be desirable. Therefore in an alternate form of this embodiment elements corresponding to elements 5, 6 and 7 could be arranged to tilt lens 3 out of the operator's line of sight each time that he manipulates knob 7 to switchover to receiving. In this way lens 3 will serve a useful function only during transmitting, i. e. that of focusing the spotlighting raster onto the object surface, and it will perform no function at all during receiving.

Figure 2:
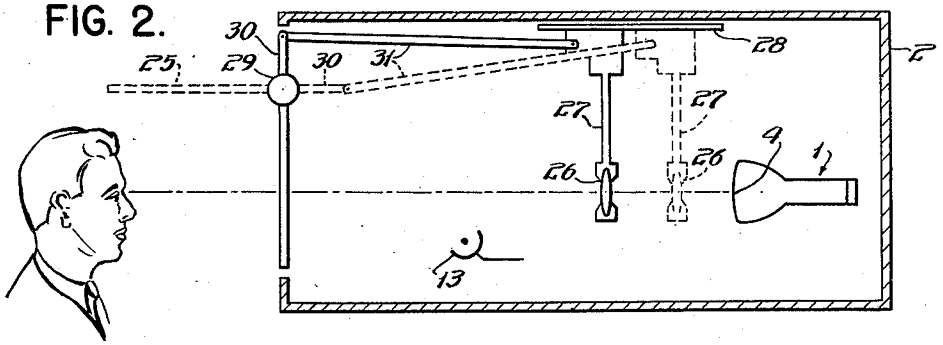
Fig. 2 shows a modification of the Fig. 1 embodiment by which the operator observes an enlarged projection of the synthesized image instead of viewing it directly.

Fig. 2 shows a modification for the arrangement of Fig. 1 whereby the image produced by tube 1 is enlarged by actual projection onto the back of opaque screen 25. Like lens 3 of Fig. 1, lens 26 projects the spotlight scanning raster onto the object surface during transmitting periods. However, unlike lens 3 it also acts as a projection system during receiving periods during which it focuses image emissions onto opaque screen 25. To this end it is essential that receiving lens 26 be moved to a different position than lens 3. Its two positions, however, can readily be determined by well known optical formulae. Lens 26 is mounted on a supporting structure 27 which is adapted to be moved backwards or forwards, in a rectilinear guide 28 provided in cabinet 2, under control of a knob 29 which is manipulated by the operator for switching from sending to receiving. Knob 29 is mechanically coupled to supporting structure 27 over an offset crank 30 and a connecting link 31 while screen 25 is directly connected to a shaft extending along the axis of knob 29 (and not shown). When knob 29 is turned through a 90° arc in a clockwise direction lens 26 is moved from its forward to its rear position and screen 25 is tilted forward out of the operator's line of sight. Photoelectric cell 13 may be located within cabinet 2 in a position where it will be exposed to light reflected from the operator's face only when opaque screen 25 is tilted out of his line of vision, i. e. when the apparatus is in its transmitting condition. If the operator neither moves his face nor diverts his line of sight in switching from receiving to sending, he will appear to the operator of a distant station with which he is in communication, to be looking into the eyes of that operator. This is a desirable feature of this embodiment and similar to that of the Fig. 1 embodiment. Since separate periods of time are allotted to transmitting and receiving, the electrical circuits and switching means may be arranged so that either for video or audio transmission a single conductor can take turns at sending and receiving.

Fig. 3 shows an embodiment in which image contrast is preserved by space separation between spotlight and image emissions rather than time separation as in the embodiments of Figs. 1 and 2. To this end the spotlighting raster is produced by tube 1 on only a portion of its fluorescent screen, for example, a portion lying entirely on one side of an imaginary line which divides the screen into two halves. These emissions are directed toward the object surface by a 45° mirror 35 and they are brought to focus on the object surface by a lens 36. As in Figs. 1 and 2 photoelectric cell 13 is positioned to receive spotlight emissions reflected from the object surface.

For image formation a raster is scanned on a portion of the fluorescent screen which lies entirely on the opposite side of the imaginary line mentioned above. An optical system, comprising another 45° mirror 37, a projection lens 38, and plane mirrors 39 and 40, serves initially to receive image rays from tube 1 and to divert them away from the spotlight projection system, and then to project them to the back surface of a translucent back projection screen 41 over a propagation path no part of which is coaxial with any part of the propagation path of the spotlighting rays and to form on screen 41 an enlargement of the image synthesized by tube 1. Screen 41 is located in a position where it can be observed conveniently by the operator along a line of sight offset from the optical axis of the scanning spotlight projected on his face.

Since this arrangement results in space separation of spotlighting and image emissions, time separation is unnecessary. Therefore, the two kinds of emissions can be produced in periods which alternate so rapidly that the subjective effect on operators will be that analysis and synthesis will seem continuous and therefore simultaneous. It will be feasible to allot either the periods of alternate high frequency sweeps or of alternate frames to the alternate generation of spotlight emissions or image emissions.

Obviously, while the operator is looking at an image on screen 41 the eyes of his own image, as transmitted to a distant station, will not appear to be looking into those of its operator. However, the operator may overcome this by occasionally glancing into the center of lens 36.

Where a reduction in the number of transmission lines between stations is more desirable than the enjoyment of simultaneous sending and receiving, it will be possible to employ operator-controlled switches, as in Figs. 1 and 2 for selecting separate periods of time for sending and receiving and for employing one or more single lines for alternate transmissions in opposite directions. However, should such switches be employed it would not be necessary to employ in connection with them any mechanical devices, such as those shown in Figs. 1 and 2, for physically moving any element of either optical system on the occasion of each changeover between sending and receiving. Both lens 36 and lens 38 need only initially to be set in proper focus, that is, once properly set, they may remain undisturbed.

Spotlighting emissions and image emissions, in traveling respectively over entirely different paths, pass through entirely separate systems and no element of either system can interfere with propagation through the other. And, in deciding whether such switches should be employed, it should be borne in mind that the time separation which they permit is unnecessary for preserving contrast and has no significant effect on it one way or the other.

In Fig. 3 tube 1 is again shown to be electromagnetically deflected. For this embodiment, however, an additional means for deflection is provided, to wit, means for electrostatically shifting the beam back and forth, along the axis of the low frequency magnetic deflections, between two positions which are, respectively, located on opposite sides of the imaginary line mentioned above and which constitute separate starting positions for the formation of analyzing and synthesizing rasters. In other words, the purpose of this arrangement is to position alternate frames, respectively, on the separate portions of the fluorescent screen from which spotlight emissions and image emissions are to emanate. For this purpose, a generator 42 produces square waves each of which has the same duration as one low frequency sweep and successive ones of which are of opposite polarity to each other. Square wave generator 42 is synchronized with saw-tooth generator 19 over line 43 which may interconnect the two devices in a known manner. This will have the effect indicated in Fig. 3*a*, namely that of the output of generator 42 each one of a train of alternate square waves which have one polarity will occur in synchronism with, and will last as long as, one low frequency sweep allotted to sending, and that each one of a train of alternate square waves which have the opposite polarity will occur in synchronism, and will last as long as, one low frequency sweep allotted to receiving. Therefore, during a sending period a raster will be produced whose position, in the dimension from left to right as shown in the drawing, will be to the left of the imaginary center line due to the effect on the beam of a deflecting square wave of negative polarity, whereas during a receiving period an image raster will be produced whose position, in the same dimension, will be to the left of the center line due to the effect of a square wave of positive polarity.

It is obvious that normally, i. e. in the absence of the beam current modulations produced by picture signals, the image raster should emit little or no light so that there will be sufficient contrast between image highlights and shadows, and it is equally obvious that the spotlighting raster should normally emit a substantial amount of light. For this reason the electron beam current should be much lower during the formation of an image raster than during the formation of a spotlighting raster. In Fig. 1 an arrangement was shown for manually changing the grid-to-cathode bias of tube 1 in switching between sending and receiving. In the present embodiment this is done electronically and at a very much higher rate of speed by appropriately applying the output of generator 42 to the control grid of tube 1. In the construction of generator 42 it may be advantageous to include means, such as one or more potentiometers, by which the amplitude(s) of the square waves as applied to the control grid may be varied to obtain desired levels of light output during sending and receiving.

Where the transmission time between any two stations in the system is substantially shorter than the interval between successive frames it will be feasible to send and receive over a common conductor between the stations. For this purpose an electronic switch 44 is employed for alternately transferring energy into the line from amplifier 15 or out of the line to the grid of tube 1. In practice it will probably be necessary to locate a mixer stage at point 45 so that square waves from generator 42 and video signals from switch 44 may both be fed to the control grid of tube 1 without undesired interaction between the switch and the generator. By properly synchronizing this equipment with that of a distant station, line 12 will serve during successive periods to transmit frames of video intelligence in opposite directions between the stations. As indicated above both the alternate sending periods and the alternate receiving periods will have such a high reoccurrence rate that the effect upon the operators will be that of continuous and concurrent sending and receiving.

Fig. 4 shows another embodiment of the invention whereby space separation of spotlight emissions and image emissions is obtained. The cathode ray tube 50 employed in this embodiment is of a special type. Its target structure comprises three elements, a first-surface fluorescent screen 51 facing toward the electron gun, an intermediate layer 52 of material which is a poor conductor of light but is electron penetrable, for example, a thin sheet of aluminum, and a second-surface fluorescent screen 53 facing away from the electron gun. In practice, it may be feasible for the intermediate layer to serve as a supporting structure for the two fluorescent screens. The electron beam can be made to penetrate the intermediate film and to excite the second-surface screen if the accelerating voltage is made to exceed a predetermined value, such as 10,000 volts. But for relatively low accelerating voltages, for example, near to or below 5,000 volts, penetration will not occur and the second surface fluorescent screen will not be excited. The spotlight scanning raster is produced by the first surface layer 51 and is focused onto the object surface by lens 54. Lens 54 is shown to be perforated so that it may be fitted over the neck of tube 50. However, as long as its target structure is of the kind shown herein, tube 50 does not have to be a straight tube. Instead, its envelope may have the well known pipe shape. The arrangement of Fig. 4, in addition to preserving image contrast, permits use of brilliant first surface emissions for spotlight scanning. Therefore, photo tube 13 will receive higher values of useful light than otherwise. During sending periods only the first surface screen is excited. During receiving periods the accelerating voltage is increased so that the electron beam penetrates intermediate layer 52 and excites second surface fluorescent screen 53. While the light thus produced in screen 53 will be free to radiate through the image transmission path, any emissions produced by the first surface layer either during sending or receiving will be blocked from going in the same direction due to the presence of opaque layer 52. As is known, beam focus can be substantially preserved when a substantial change is made in the accelerating voltage providing the focusing voltage is changed at the same time and by such an amount that the ratio between the new values of these voltages equals the ratio between their original values. This may be conveniently accomplished by the following arrangement shown in Fig. 4. A voltage divider 55 is connected across a source of high potential which is represented as being a battery in series with a dropping resistor, but which, in practice, may be the output terminals of the filter section of a high voltage rectifier. Focusing and accelerating voltages are taken from the appropriate taps of the voltage divider and are connected to the focusing and accelerating electrodes. A high voltage tube 57, for example, a triode, is connected in shunt to the voltage divider and its control grid, or any other convenient electrode depending upon the exact nature of the shunt tube, is connected to a generator corresponding to generator 42 of the Fig. 3 embodiment. When a positive square wave is impressed upon the control grid of tube 57, the current drain on the power supply will be increased. This will increase the voltage drop across dropping resistor 56 and will correspondingly decrease the voltage applied across voltage divider 55. Thus both the accelerating voltage and the focusing voltage will be reduced at the same time and, since the positions of the taps will not have been disturbed in any way, the ratio of the new levels of these voltages will be equal to the ratio of their old levels.

An electronic switch 44 which may be identical to that of Fig. 3 is employed in a manner already described so that a single transmission line may serve for alternate sending and receiving. Similarly, the output of generator 42 is applied to the control grid to periodically change its level of bias for optimum performance during successive sending and receiving periods. An optical system 38, 39, 40 and 41 corresponds to a similar system of the Fig. 3 embodiment and performs a corresponding function.

Fig. 5 shows another embodiment which meets the problem of light admixture in such a way as to permit effectively simultaneous sending and receiving as well as the use of an optical system for spotlight focusing which can remain in fixed adjustment during analysis and synthesis. In this embodiment it is neither necessary to use a cathode ray tube having a special target structure nor to use a special sweeping arrangement for scanning different portions of the screen for, respectively, producing spotlight and image emissions. Instead there is employed for spotlight focusing a reflective optical system of very high efficiency which permits the spotlight emissions to be of a relatively low level. Admixture of this low level light with image light is simply tolerated in one form of this embodiment since the loss of contrast will not be substantial. In the preferred form of this embodiment shown in Fig. 5, however, a revolving shutter, which operates in synchronism with the beam deflections, blocks the path of image transmissions from tube 1 to a mirror 60 during the sending intervals when scanning spotlight is being emitted. The tube shown in Fig. 5 is a conventional straight kinescope employing second surface emissions and, therefore, is identical to the tube shown in Fig. 1. However, as will be more apparent when this embodiment has been fully described, this embodiment may be somewhat rearranged in several obvious ways so that first surface emissions can be utilized, for example, by the use of a pipe-shaped tube. In Fig. 5 light from the second-surface of screen 4 of tube 1 is received by a spherical mirror 60 which reflects the rays toward the object surface. A correction plate 61 is interposed in a known manner in the pathway of these rays to compensate for spherical aberration in a known manner. The correction plate may contain a central perforation for permitting it to be located in a plane at an optically suitable distance from mirror 60 even though the tube neck passes through that plane. Mirror 60 has a central opening for permitting emissions from screen 4 to be directed into an image light transmission path. As will be explained below screen 4 will generate spotlight emissions and image emissions during successive periods at such a high recurrence rate that effectively simultaneous sending and receiving will be achieved. Because of this fact, and since this embodiment does not afford space separation for the two kinds of emissions over their entire paths of transmission from the tube screen to the operator, obviously some of the spotlighting emissions will become admixed with the image emissions. The admixed light will actually be produced at different instants of time than the image light, the subjective effect on operators will be some loss of contrast. However, this loss of contrast will be slight because the Schmidt optical arrangement employed for focusing spotlight emissions has such high relative efficiency that spotlighting may be effected at a very low intensity level. It has been demonstrated that in certain Schmidt systems the amount of usefully projected light was increased from less than 4% to about 25%. This increase by a factor of approximately 7 permits a corresponding decrease in the intensity required in initially generating the spotlighting raster on the tube screen. For this purpose there may be employed a square wave generator which is of the same kind as generator 42 of Fig. 3 and which also operates in synchronism with the sweeps for changing the control grid bias back and forth between two values for sending and receiving. The generator may be synchronized either with the high or low frequency sweeps depending upon whether it is desired to allot successive high or low frequency scanning periods for sending and receiving. In the latter case each sending and receiving period will equal a frame period. The lens 62 is placed in a position for receiving light from screen 4 and directing it through the opening in mirror 60 into the image light transmission path. Behind the spherical mirror this light is received on a 45° mirror 63 whence it is directed to a similar plane mirror 64 which reflects the light onto the rear of back projection screen 65. Lens 62 is positioned in the image light transmission path, i. e. on the optical axis between screen 4 and mirror 63 at a position determinable in a known manner for focusing onto screen 63 the image produced on screen 4. The portion of the Fig. 5 arrangement thus far described comprises, without more, a simplified form of this embodiment which will be serviceable and operable where a limited amount of loss of contrast can be tolerated. However, image contrast can be further improved as is shown in Fig. 5 by employing a revolving shutter 66 which is mounted on the shaft of a motor 67. Motor 67 is connected to the sweeping generator for synchronizing it to make exactly one revolution for each send-receive cycle of operation of tube 1 and for assuring that shutter 66 will block and unblock the image light transmission path during sending and receiving periods, respectively. In other words, in addition to the rotations of motor 67 being synchronous with the cyclical rate at which sending and receiving alternate, each half rotation must be appropriately in step with a sending or receiving period. Arrangements for accomplishing in-phase operation between a motor and a sweep generator, for example a motor driving a rotating filter disc, are already known and do not constitute the invention herein. Therefore, this is not being shown in detail herein. However, in Fig. 5 line 68 represents a synchronizing connection between motor 67 and the sweep generator.

Photoelectric cell 13 may be physically located and electrically connected in this embodiment as shown above for other embodiments. It will be particularly advantageous to employ a photo multiplier tube because its great sensitivity will permit the use of even lower intensity spotlighting and this will further lessen the small deterioration in contrast in Fig. 5 arrangements which do not employ a revolving shutter.

The definition or picture quality required for intercommunication can often be of a lower order than that required for television generally. Therefore, for certain embodiments it may be feasible to employ a high frequency scanning rate equal to that conventionally used in television but to utilize some of the scans for transmission and the others for reception, for example, every odd scan for sending and every even scan for receiving. In such a case the rate of rotation of motor 67 will be higher than in cases where sending and receiving occur during successive frames. The criterion to be employed in deciding is whether it is preferred to tolerate the possibility of a little flicker or some loss of definition.

In any case the various stations must operate synchronously. To achieve synchronization sweep voltages may be provided to all of the stations from a single sweep generator either located at an intermediate point or at a master station. Where it is desired to utilize the least possible number of conductors between stations, operator-controlled switchover means similar to those already described and illustrated herein may be employed. This will permit a reduction in the number of audio transmission lines, though it will not be necessary for reducing the number of video transmission lines where electronic switching is employed. Where manual switching is used, the switches may be spring-loaded so as normally to be held in their receiving positions. All of the stations would thus normally be in their receiving conditions. However, when an operator would depress his switch for transmitting, this would disconnect a video line, such as line 12 in Fig. 1 and Fig. 3, from the control grid of the cathode ray tube at this station and connect it to the output of his photoelectric cell transmission channel thus completing a through-connection from his own sending apparatus to the receiving apparatus of one or more of the other stations.

From the foregoing it is apparent that the Fig. 5 embodiment is of a type suitable for effectively simultaneous transmitting and receiving. When it is thus used, the video system should either comprise separate sending and receiving lines or the combination of one or more lines which function alternately at sending and receiving with an electronic switch as described above provided the transmission time between stations is less than the interval between a sending and receiving period.

What is claimed is:

A television intercommunication system having at least one station provided with a fluorescent screen cathode ray tube, means including a generator of sweep voltages for scanning the screen of the tube with its electron beam in accordance with a predetermined scanning pattern, a Schmidt optical arrangement of relatively high efficiency for gathering light emitted from the screen and projecting it onto an imaginary plane near an object, photoelectric cell for receiving light reflected from the object, a video transmission line extending between the station and at least one other station of the system, an electronic switch synchronized with the sweep generator for alternately connecting the video line to the control grid of the tube and to the output of the photoelectric cell during successive sweeping periods, a spherical mirror of the Schmidt optical system being perforated near its center for permitting light rays emanating from the tube screen to be transmitted through the mirror in a direction substantially opposite to that of the rays projecting onto said imaginary plane, a second optical system for projecting upon a viewing screen light received from the tube through the perforation in the spherical mirror, means for intermittently blocking the light transmission path of the second optical system at a point therealong beyond the back of the spherical mirror during periods of time when said video line is connected to the photoelectric cell, the means for intermittently blocking comprising a motor connected to the sweep generator for synchronous operation therewith, a shutter connected to the shaft of the motor, a generator of periodic voltages synchronized with the sweep generator and connected to the control grid of the tube for alternately changing the grid-to-cathode bias between two predetermined levels during successive sweeping periods for changing the level of light emissions from the tube screen during those periods, whereby the average intensity of the emissions when said video line is connected to the control grid is relatively much higher than the average level of emissions during periods when it is connected to the output of the photoelectric cell.

CONSTANTIN S. SZEGHO.
THOMAS G. POLANYI.

REFERENCES CITED

The following references are of record in the file of this patent:

UNITED STATES PATENTS

| Number | Name | Date |
|---|---|---|
| 2,102,139 | Vance | Dec. 14, 1937 |
| 2,157,749 | Du Mont | May 9, 1939 |
| 2,206,654 | Zworykin | July 2, 1940 |
| 2,250,169 | Schwarzer | July 22, 1941 |
| 2,260,709 | Gray | Oct. 28, 1941 |
| 2,420,198 | Rosenthal | May 6, 1947 |
| 2,438,256 | Stein | Mar. 23, 1948 |
| 2,476,698 | Clapp | July 16, 1949 |

FOREIGN PATENTS

| Number | Country | Date |
|---|---|---|
| 866,192 | France | June 27, 1941 |
| 687,728 | Germany | Jan. 11, 1940 |

OTHER REFERENCES

Principles of Television Engineering, Fink, McGraw-Hill Book Co., 1940, pages 90 and 91.

Television News, Sept.-Oct., 1932, pages 174-176.